US 6,718,070 B2

(12) United States Patent
Hamamura

(10) Patent No.: US 6,718,070 B2
(45) Date of Patent: Apr. 6, 2004

(54) DEVICE AND METHOD FOR DETECTING SUBJECT INCLINATION

(75) Inventor: Toshihiro Hamamura, Osaka (JP)

(73) Assignee: Minolta Co., Ltd., Osaka (JP)

( * ) Notice: Subject to any disclaimer, the term of this patent is extended or adjusted under 35 U.S.C. 154(b) by 589 days.

(21) Appl. No.: 09/788,676

(22) Filed: Feb. 21, 2001

(65) Prior Publication Data

US 2001/0021277 A1 Sep. 13, 2001

(30) Foreign Application Priority Data

Feb. 24, 2000 (JP) ........................... 2000-047471

(51) Int. Cl.[7] .................. G06K 9/36; H04N 3/22; G02B 27/32
(52) U.S. Cl. ................ 382/289; 348/745; 355/39
(58) Field of Search ................ 382/181, 199, 382/201, 203, 221, 232, 243, 289, 296; 348/739, 745; 355/39, 52; 358/302; 345/649, 651

(56) References Cited

U.S. PATENT DOCUMENTS 6,310,662 B1 * 10/2001 Sunakawa et al. .......... 348/747
6,411,363 B1 * 6/2002 Kamada et al. ............. 355/52

FOREIGN PATENT DOCUMENTS

JP      6-68245     3/1994
JP      9-237318    9/1997

* cited by examiner

Primary Examiner—Bhavesh M. Mehta
Assistant Examiner—Kanji Patel
(74) Attorney, Agent, or Firm—Morrison & Foerster LLP

(57) ABSTRACT

A subject inclination detector provided with: a display for displaying on a screen a subject image comprising a plurality of pixels; a pixel specifier for a user to specify a first pixel from among the pixels; a calculator for defining a pixel group constituting a circumference of an area including the specified first pixel, and calculating deviations in pixel value between adjoining pixels of the pixel group; and a detector for selecting a second pixel and a third pixel based on the calculated deviations, and detecting an inclination of a straight part of the subject based on the selected second and third pixels.

24 Claims, 9 Drawing Sheets

DEVICE AND METHOD FOR DETECTING SUBJECT INCLINATION

This application is based on application No. 2000-47471 filed in Japan, the content of which is hereby incorporated by reference.

BACKGROUND OF THE INVENTION

1. Field of the Invention

The present invention relates to image data editing.

2. Description of the Prior Art

In performing taking photographs with a camera, there are cases where the camera inclines due to a shake of the camera caused by a hand movement or the like. The inclination of the camera causes a problem when a subject including a horizontal straight line such as the horizon or a vertical straight line such as a tall tree or a high-rise building is photographed. That is, when a horizontal straight line or a vertical straight line is photographed with the camera inclined, a disagreeable print is obtained in which the subject is inclined with respect to the horizontal or the vertical direction of the photographic frame. In the case of a digital image taking with a digital camera or the like, a disagreeable image is obtained in which the horizontal or the vertical straight line is inclined with respect to the display frame of the monitor.

Such an image can be corrected so that the horizontal or the vertical straight line in the image is parallel to the display frame of the monitor by capturing the image in a computer and rotating it by use of an image editing software program. Specifically, the user captures the digital image into a computer, and enters a rotation angle into the image editing software program (for example, "Photoshop" by Adobe Systems Incorporated). Then, the image is displayed being rotated by the rotation angle, so that the horizontal or the vertical straight line is parallel to the horizontal direction or the vertical direction of the display frame of the monitor.

For the user to enter the rotation angle of the image, it is necessary to determine how much the subject is inclined. However, it is not easy to determine the angle at which the image displayed on the monitor is inclined. It is necessary for the user to first enter a rotation angle considered appropriate and viewing the rotated image, further enter another rotation angle to correct the inclination. It is cumbersome for the user to find out the rotation angle through such trial and error.

Other methods of determining how much the subject is inclined include determining the subject inclination by the user specifying two points on a horizontal or a vertical straight line to identify the horizontal or the vertical straight line and calculating the inclination of the straight line. To correct the subject inclination, the image is rotated so that the straight line is parallel to the horizontal or the vertical direction of the display frame of the monitor.

However, even by this method, the subject inclination cannot accurately be determined when the straight line determined by the specified two points and the horizontal or the vertical straight line do not coincide with each other, that is, when the specified two points are not situated on the horizontal or the vertical straight line. Therefore, when the image is rotated based on the obtained inclination, the horizontal or the vertical straight line in the rotated image is not parallel to the horizontal or the vertical direction of the display frame of the monitor.

SUMMARY OF THE INVENTION

An object of the present invention is to provide a device and a method for detecting the inclination of a subject.

A first aspect of the present invention provides an inclination detecting device comprising:

a display for displaying on a screen a subject image comprising a plurality of pixels;

a pixel specifier for a user to specify a first pixel from among the pixels;

a calculator for defining a pixel group constituting a circumference of an area including the specified first pixel, and calculating deviations in pixel value between adjoining pixels of the pixel group; and a detector for selecting a second pixel and a third pixel based on the calculated deviations, and detecting an inclination of a straight part of the subject based on the selected second and third pixels. Moreover, the first aspect of the present invention provides an image processing apparatus provided with the inclination detecting device.

According to this structure, when the user specifies the first pixel, an area including the first pixel is defined, and based on the pixel value deviations of the pixel group surrounding the area, the second pixel and the third pixel are selected. Based on the selected second and third pixels, more concretely, the inclination of the straight line determined by the second and the third pixels is detected as the inclination of the straight part of the subject. Since the inclination of the straight part of the subject represents the overall inclination of the subject in the image, how much the subject is inclined can easily be detected.

The detector selects pixels where the deviations are maximum and minimum as the second pixel and the third pixel.

The detector detects the inclination of a straight line connecting the second pixel and the third pixel as the inclination of the straight part of the subject, and the inclination detecting device further comprises an image rotation processor for rotating the image based on the detected inclination of the straight part to thereby correct the inclination.

According to this structure, the image is rotated based on the detected inclination of the subject, whereby the inclination of the subject can be corrected. Consequently, only by specifying the first pixel, the user can obtain an image where the inclination is corrected.

The image rotation processor decides the direction in which the image is rotated, according to the inclination of the straight part.

According to this structure, the direction in which the image is rotated is decided according to the detected inclination of the subject. With this, the direction in which the image is rotated is decided and the inclination of the subject is corrected without the need for the user to specify the direction. Consequently, the load on the user is reduced.

Another aspect of the present invention provides an inclination detecting method comprising:

displaying on a screen a subject image comprising a plurality of pixels;

accepting a specifying, by a user, of a first pixel from among the pixels;

defining a pixel group constituting a circumference of an area including the specified first pixel and calculating deviations in pixel value between adjoining pixels of the pixel group;

selecting a second pixel and a third pixel based on the calculated deviations; and detecting an inclination of a straight part of the subject based on the selected second and third pixels.

Moreover, this aspect of the present invention provides an image processing apparatus executing the inclination detecting method.

According to this method, when the user specifies the first pixel, an area including the first pixel is defined, and based on the pixel value deviations of the pixel group surrounding the area, the second pixel and the third pixel are selected. Based on the selected second and third pixels, more concretely, the inclination of the straight line determined by the second and the third pixels is detected as the inclination of the straight part of the subject. Since the inclination of the straight part of the subject represents the overall inclination of the subject in the image, how much the subject is inclined can easily be detected.

In the selecting, pixels where the deviations are maximum and minimum are selected as the second pixel and the third pixel.

In the detecting, the inclination of a straight line connecting the second pixel and the third pixel is detected as the inclination of the straight part of the subject, and the inclination detecting method further comprises rotating the image based on the detected inclination of the straight part to thereby correct the inclination.

According to this method, the image is rotated based on the detected inclination of the subject, whereby the inclination of the subject can be corrected. Consequently, only by specifying the first pixel, the user can obtain an image where the inclination is corrected.

In the rotating, the direction in which the image is rotated is decided according to the inclination of the straight part.

According to this method, the direction in which the image is rotated is decided according to the detected inclination of the subject. With this, the direction in which the image is rotated is decided and the inclination of the subject is corrected without the need for the user to specify the direction. Consequently, the load on the user is reduced.

Still another aspect of the present invention provides a computer program product for executing a method comprising:

displaying on a screen a subject image comprising a plurality of pixels;

accepting a specifying, by a user, of a first pixel from among the pixels;

defining a pixel group constituting a circumference of an area including the specified first pixel and calculating deviations in pixel value between adjoining pixels of the pixel group;

selecting a second pixel and a third pixel based on the calculated deviations; and detecting an inclination of a straight part of the subject based on the selected second and third pixels.

Moreover, this aspect of the present invention provides an image processing apparatus executing such a computer program.

According to this computer program product, when the user specifies the first pixel, an area including the first pixel is defined, and based on the pixel value deviations of the pixel group surrounding the area, the second pixel and the third pixel are selected. Based on the selected second and third pixels, more concretely, the inclination of the straight line determined by the second and the third pixels is detected as the inclination of the straight part of the subject. Since the inclination of the straight part of the subject represents the overall inclination of the subject in the image, how much the subject is inclined can easily be detected.

In the selecting, pixels where the deviations are maximum and minimum are selected as the second pixel and the third pixel.

In the detecting, the inclination of a straight line connecting the second pixel and the third pixel is detected as the inclination of the straight part of the subject, and the computer program product further comprises rotating the image based on the detected inclination of the straight part to thereby correct the inclination.

According to this computer program product, the image is rotated based on the detected inclination of the subject, whereby the inclination of the subject can be corrected. Consequently, only by specifying the first pixel, the user can obtain an image where the inclination is corrected.

In the rotating, the direction in which the image is rotated is decided according to the inclination of the straight part.

According to this computer program product, the direction in which the image is rotated is decided according to the detected inclination of the subject. With this, the direction in which the image is rotated is decided and the inclination of the subject is corrected without the need for the user to specify the direction. Consequently, the load on the user is reduced.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

An embodiment of the present invention will hereinafter be described.

First, a digital image to be processed will be explained. A digital image is an image converted into digital data, that is, image information stored as an image file of a computer or the like. When a subject is photographed with a digital camera, the image file is created by the digital camera so as to comply with a standard such as the DCF. When a subject is photographed with a camera using silver halide film, the image information on the image film is captured by a film scanner and processed by a computer, thereby creating an image file.

In the image file, the image including the subject is expressed by a plurality of pixels. Here, a "pixel" is a unit of a digital image representing one color tone by a pixel value which is brightness information of red (R), green (G) and blue (B). For the image in the image file, for example, the size is 1600 (width) by 1200 (length) pixels and the gradation is red (R), green (G) and blue (B) with each of these being expressed by 8 bits.

The data of the digital image is frequently compressed in order to reduce the file size. In this specification, it is assumed that the data of the digital image is compressed by the JPEG (Joint Photographic Experts Group) compression method. The image file of the generated digital image can be stored on an appropriate record medium, for example, a magnetic record medium such as a floppy disk or a hard disk, an optical record medium such as an optical disk, or a compact flash card inserted into the digital camera. Image data will be called "image data" irrespective of whether it is compressed or decompressed.

Figure 1:
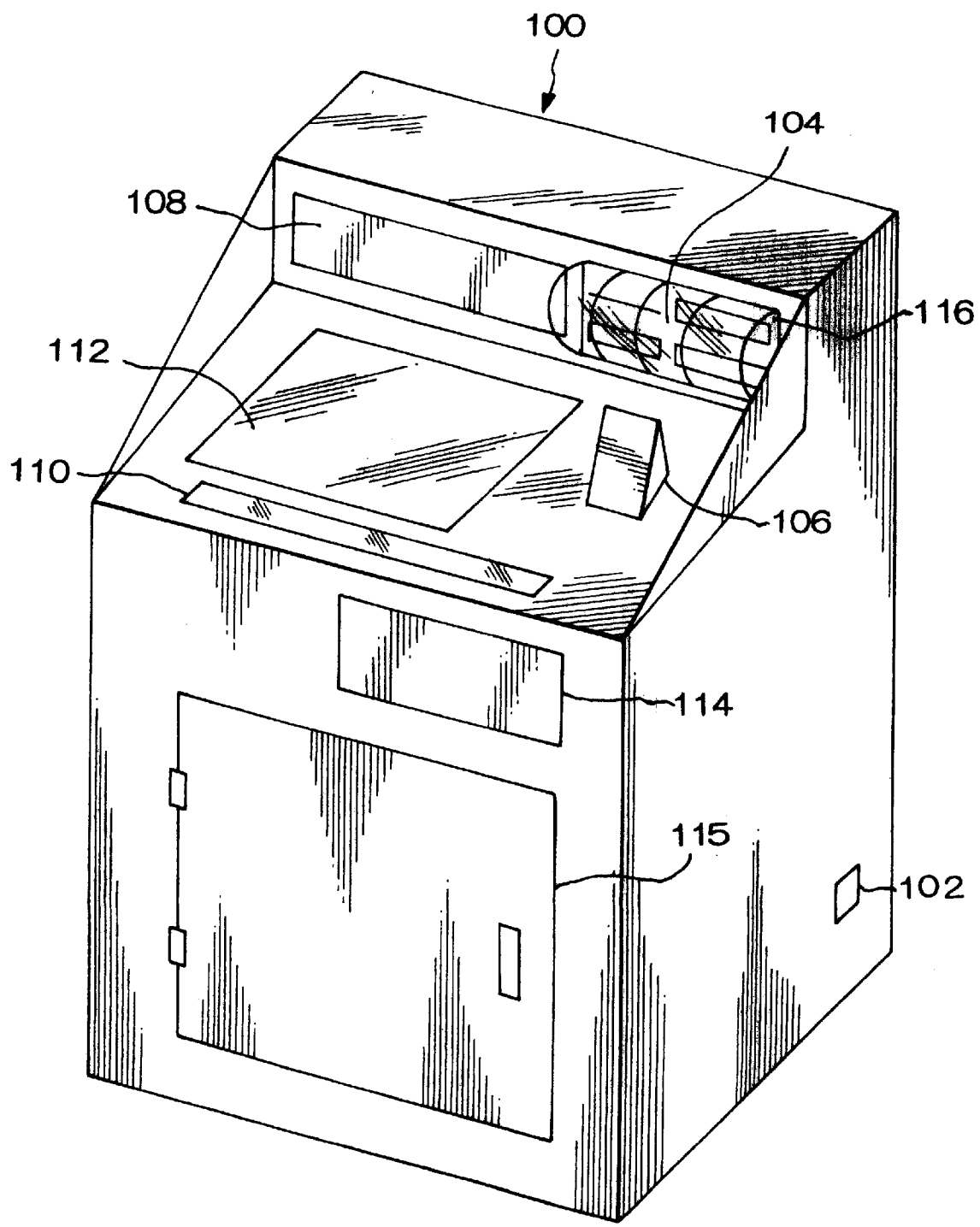
FIG. 1 is a view showing the appearance of an image processing apparatus.

Now, an apparatus 100 for detecting and correcting the inclination of the subject in an image according to the embodiment will be described with reference to FIG. 1 (hereinafter, the apparatus 100 will be referred to as "image processing apparatus 100"). FIG. 1 shows the appearance of the image processing apparatus 100. The image processing apparatus 100 detects the inclination of a straight part of the subject. Since the overall inclination of the subject is determined based on the inclination of the straight part of the subject, how much the subject is inclined can easily be detected. Further, the image processing apparatus 100 is capable of correcting the inclination by rotating the entire image based on the detected inclination, and printing the corrected image.

Figure 2A:
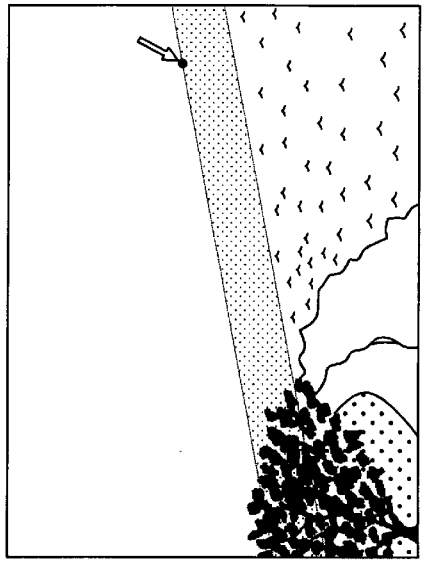
FIGS. 2A to 2D are views showing the procedure for detecting the inclination of the subject and correcting the inclination.
Figure 2B:
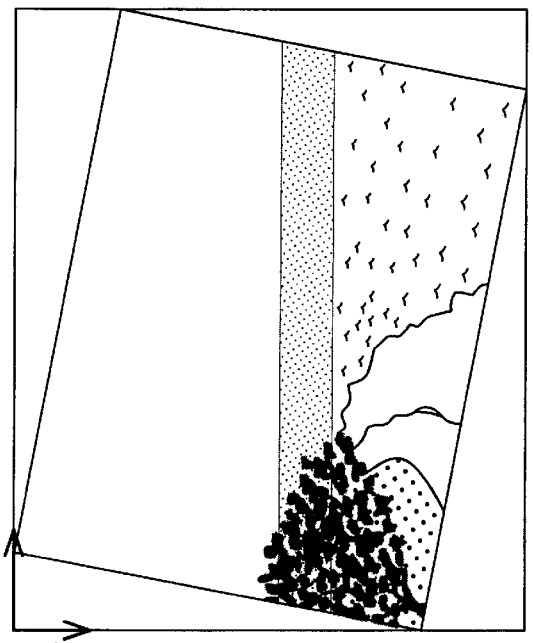

The subject inclination detection and the inclination correction performed by the image processing apparatus 100 will be described with reference to FIGS. 2A to 2D. FIG. 2A shows an image of a landscape photograph under a condition where the horizon which is a straight part of the subject is inclined, and a cursor, or an arrow. The "condition where the horizon is inclined" is a situation in which the inclination of the horizon is not 0° in a coordinate system of the x-axis parallel to the horizontal direction of the display frame of the monitor and the y-axis parallel to the vertical direction thereof. When determining that the horizon is inclined, the user specifies one point (one pixel) in the vicinity of the horizon with the cursor. FIG. 2B shows a condition where one pixel in the vicinity of the horizon is specified with the cursor.

Figure 2C:
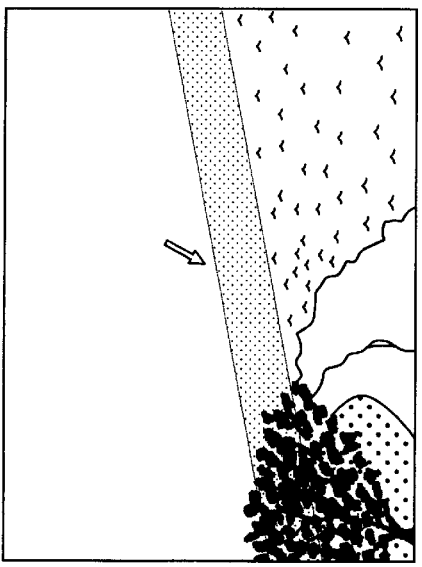
Figure 2D:
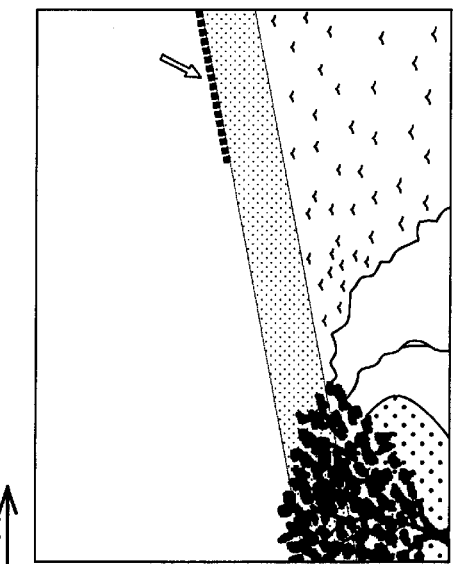

When a pixel is specified, the image processing apparatus 100 of FIG. 1 calculates the deviations in pixel value between two adjoining pixels of a pixel group. The pixel group comprises a plurality of pixels including the specified pixel and constituting the circumference of an area, for example, a circle, that the horizon crosses. As a result of calculating the deviations in pixel value, the image processing apparatus 100 selects the largest and the second largest deviations, and identifies the two pixels corresponding to the deviations. The identified two pixels are situated on the horizon. The reason therefor is as follows: Since the pixel brightness largely changes at the horizon, the larger the brightness difference between adjoining pixels is, that is, the larger the deviation in pixel value therebetween is, the pixel can be judged to be situated on the horizon. Therefore, it is determined that the straight line connecting the selected two pixels is the horizon. FIG. 2C shows the horizon identified by the image processing apparatus 100. Once the horizon is identified, the angle at which the horizon is inclined with respect to the x-axis can easily be detected by a known mathematical method. It can be said that the detected inclination of the horizon represents the overall inclination of the subject in the image. FIG. 2D shows a condition where the entire image is rotated based on the detected inclination of the horizon, that is, the inclination of the subject. The horizon becomes parallel to the x-axis by the image being rotated, so that the inclination of the subject in the image is corrected.

Referring again to FIG. 1, the image processing apparatus 100 includes a power switch 102, a media insertion portion 104, a money slot 106, a panel 108, a keyboard 110, a monitor 112, a print discharge mouth 114, a front door 115 pulled open for maintenance, and a cover 116.

The power switch 102 is a switch for activating the image processing apparatus 100.

The media insertion portion 104 is disposed in an upper part of the image processing apparatus 100, and is used for inserting an image record medium on which an image to be printed is recorded. While the media insertion portion 104 is provided with the cover 116 for protection against dust, a dust-poof shutter may be provided for each slot instead of the cover 116.

The money slot 106 is used for dropping a predetermined amount of money into the image processing apparatus 100 of a coin vendor type.

The panel 108 disposed next to the media insertion portion 104 is a display for displaying the kinds of insertable image record media. When a touch switch for selecting an image record medium is provided as mentioned later, the panel 108 can serve also as an operation portion. Into the media insertion portion 104 of the image processing apparatus 100, four kinds of image record media (smart media (SSFDC), a compact flash card, an optical disk and a floppy disk) can be inserted. These media all store JPEG-compressed image data thereon, and the compressed data is JPEG-decompressed and processed inside the image processing apparatus 100. More detailed description of the media insertion portion 104 and the panel 108 will be given later with reference to FIG. 3.

The keyboard 110 is provided for the user to enter various operation instructions. The keyboard 110 includes not only a key for selecting the image to be printed and a key for deciding the start of printing but also a key used only by a serviceperson performing maintenance of the image processing apparatus 100 and a key for forcibly discharging the print sheet.

On the monitor 112, the operation instruction provided from the keyboard 100 and the image to be printed are displayed. Further, the monitor 112 has a touch panel on the surface thereof and is capable of providing the image processing apparatus 100 with instructions, for example, an instruction to specify a pixel on the monitor. The touch panel functions as a pixel specifier 414 in the image processing apparatus 100 (see FIG. 4).

The print discharge mouth 114 is used for the image processing apparatus 100 to discharge prints.

The front door 115 is set so as to be pulled open, and is opened, for example, when a service person performs maintenance of the inside of the image processing apparatus 100.

Figure 3:
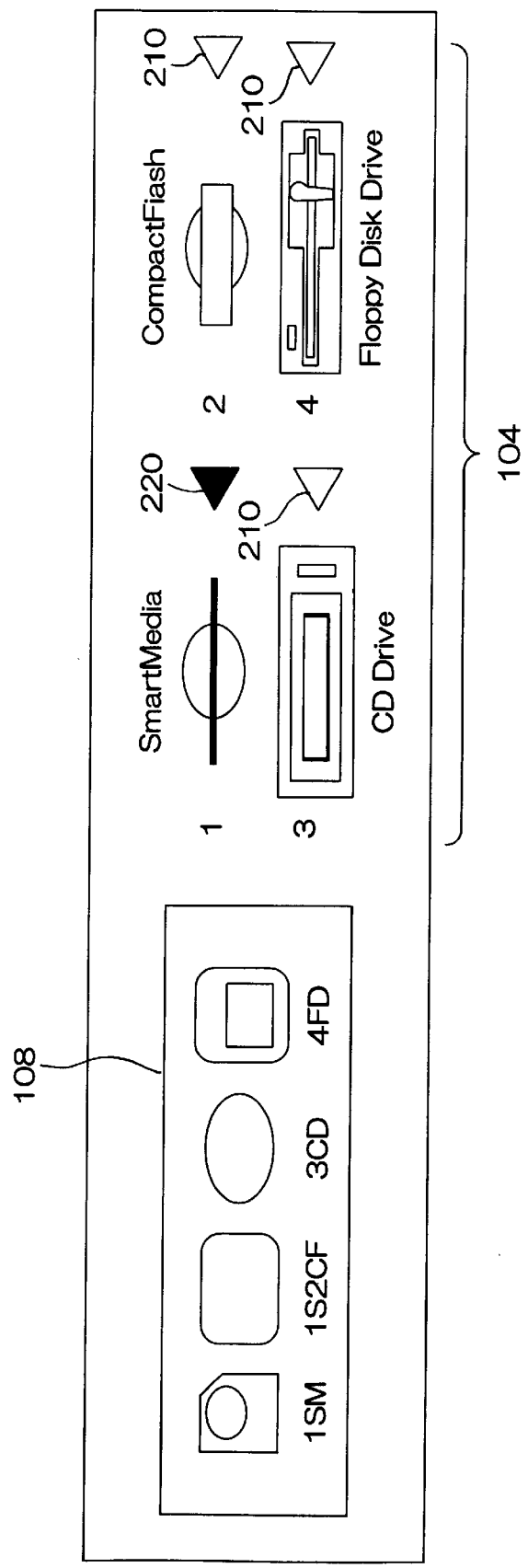
FIG. 3 is a view showing a media insertion portion and a panel in detail.

FIG. 3 shows the media insertion portion 104 and the panel 108 in more detail. As described above, four kinds of image record media can be inserted into the image processing apparatus 100. In the media insertion portion 104, slots for inserting these image record media are provided so as to be each associated with a number. The media insertion portion 104 is further provided with indicators 210 and 220 indicating where to insert the selected image record medium. On the panel 108, the shapes of the four kinds of image record media associated with the numbers are schematically shown. Symbols consisting of the numbers and letters are shown below the schematic views of the image record media on the panel 108.

The numbers on the left side of the symbols correspond to the numbers of the slots of the media insertion portion 104. A touch switch is provided on the panel 108 so that which kind of image record medium is used can be specified.

Returning to FIG. 1, a basic operation of the image processing apparatus 100 will be described. The image processing apparatus 100 is activated by the manager, the user or the like of the image processing apparatus 100 operating the power switch 102. First, the user drops a predetermined amount of money into the money slot 106 and selects the image record medium to be used on the panel 108. The user collates the kind of the image record medium with the schematic view or the abbreviation on the panel 108, and selects the image record medium to be used. A touch switch may be provided on the panel 108 so that the selection can be performed therewith, or the number corresponding to the image record medium to be used may be entered by use of the keyboard 110 to perform the selection. Alternately, the touch panel on the monitor 4 may be used to perform the selection.

When the user selects an image record medium, one of the four indicators 210 and 220 (see FIG. 3) that corresponds to the selected image record medium is turned on. In the example shown in FIG. 3, the indicator 220 corresponding to the smart media is on. The user inserts the record medium (smart media in FIG. 3) into the slot the indicator 220 of which is on. By structuring the media insertion portion 104 and the panel 108 as described above, the user can visually recognize the image record medium that he uses, and never inserts the image record medium in a wrong slot. Then, in accordance with the display on the monitor, the user provides the image processing apparatus 100 with various operation instructions, for example, an instruction to specify a pixel on the monitor 112, through the keyboard 110 and the touch panel on the monitor 112.

Based on the instructions from the user, the image processing apparatus 100 detects the inclination of a straight part of the subject displayed on the monitor 112. Detailed description of the inclination detection will be given later. The user checks the result of the detection, and when it is incorrect, the user causes the image processing apparatus 100 to retry the inclination detection. When the inclination of the straight part of the subject is correctly detected, the user instructs the image processing apparatus 100 to rotate the image to correct the inclination, and causes the apparatus 100 to display the image. When determining that the inclination of the subject is corrected, the user instructs the image processing apparatus 100 to start printing. The image processing apparatus 100 includes a printer for printing normal photographs, and starts printing in response to the print start instruction. The image processing apparatus 100 discharges the printed photographic paper or the like through the print discharge mouth 114 and finishes the operation.

The print discharged into the print discharge mouth 114 and the inserted image record medium are taken out by the user. Even in a case where the inclination of the subject is accurately corrected, when the user intends not to print the image but to store the image onto a record medium, the data is stored onto the record medium desired by the user.

Figure 4:
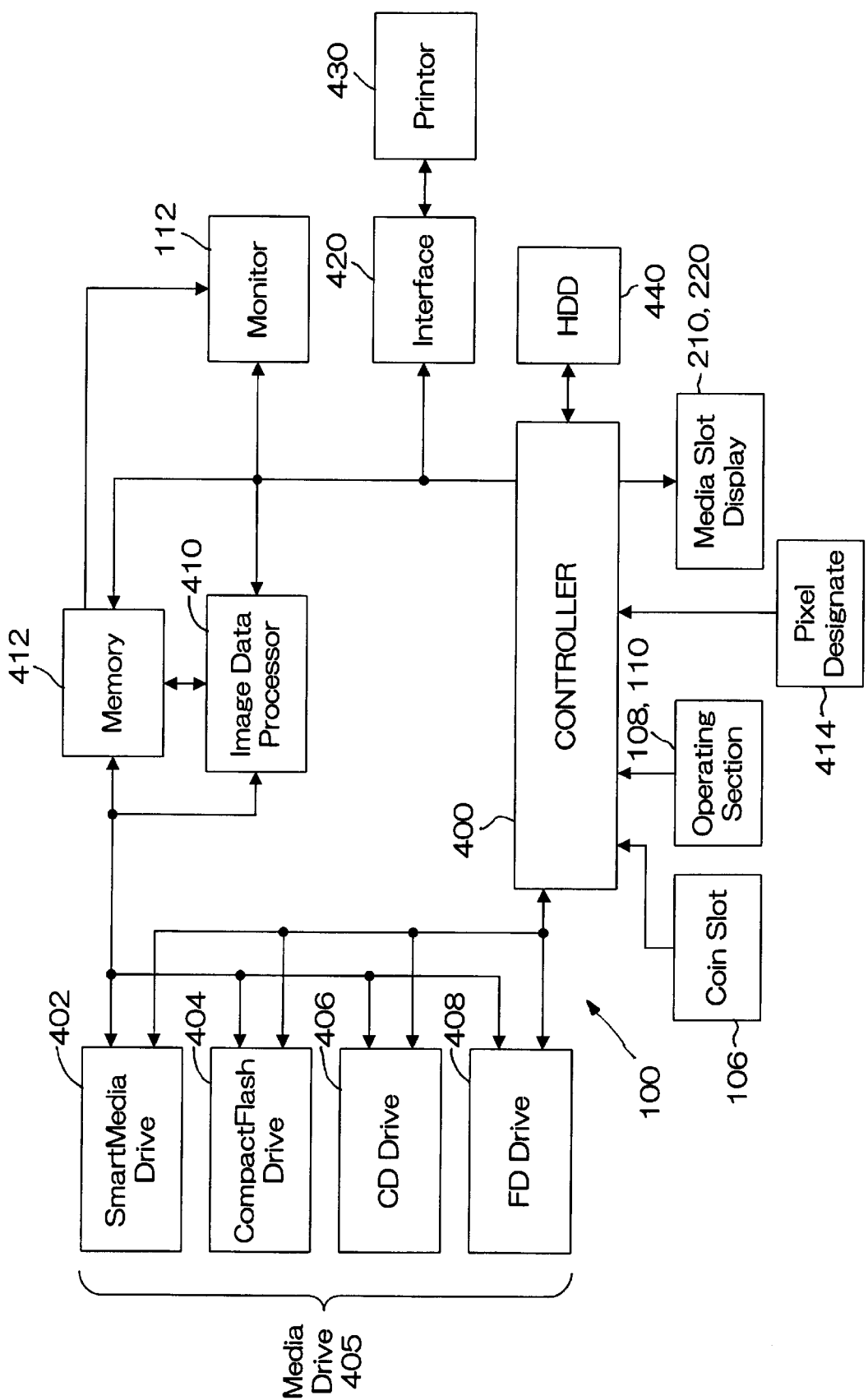
FIG. 4 is a block diagram showing the internal structure of the image processing apparatus.

Next, the internal structure of the image processing apparatus 100 and the processing performed inside the image processing apparatus 100 will be described. FIG. 4 is a block diagram showing the internal structure of the image processing apparatus 100. The image processing apparatus 100 includes the operation portions 108 and 110, the money slot 106, the insertion slot indicators 210 and 220 and the monitor 112. The image processing apparatus 100 further includes an overall controller 400, a drive portion 405 for usable image record media, an image data processor 410, a memory 412, the pixel specifier 414, an interface 420, a printer 430 and a hard disk drive 440.

Now, the functions of the internal structure elements will be described before describing the internal processing of the image processing apparatus 100. However, descriptions of the operation portions 108 and 110, the money slot 106, the insertion slot indicators 210 and 220 and the monitor 112 described with reference to FIGS. 1 and 3 are omitted. The operation portion 108 represents the touch switch of the panel 108 (see FIG. 3), the operation portion 110 represents the keyboard 110 (see FIG. 1), and the insertion slot indicators 210 and 220 represent the insertion slot indicators of the image record media (see FIG. 3).

The overall controller 400 controls overall operations of the elements of the image processing apparatus 100. Specifically, the overall controller 400 performs operations such as: checking the money dropped in the money slot 106 (see FIG. 1); receiving instructions from the operation portions 108 and 110; turning on the insertion slot indicators 210 and 220; transmitting an image data reading instruction to the drive portion 405, and receiving image data; receiving the position of the pixel specified by the pixel specifier 414; defining the pixel group; calculating the deviations between pixels of the pixel group; transmitting an image data processing instruction to the image data processor 410; transmitting an image data storage instruction and an image data reading instruction to the memory 412; transmitting a display instruction to the monitor 112; transmitting image data to the printer 430; and controlling operations. These operations are performed in accordance with computer programs stored on the hard disk drive 440.

The drive portion 405 includes a smart media drive 402, a compact flash drive 404, an optical disk drive 406 and a floppy disk drive 408. These drives of the drive portion 405 all read image data from the image record media in response to an instruction from the overall controller 400, and outputs the read image data to the overall controller 400 or to the image data processor 410. Drives other than the drives described above may be used as long as they perform such processing.

In response to an instruction from the overall controller 400, the image data processor 410 processes for display and printing the image data received from the memory 412 or from the drive portion 405.

In the memory 412, the image data received from the drive portion 405 and the image data processed by the image data processor 410 are stored. In response to an instruction from the overall controller 400, the memory 412 reads stored image data and transmits it to the monitor 112 or transmits it to the printer 430 through the interface 420.

The pixel specifier 414 is provided for the user to specify a pixel on the monitor screen. Examples of the pixel specifier 414 include a touch panel, a trackball and a mouse.

The interface 420 relays bidirectional communication between the overall controller 400 and the printer 430. An example of the data transmitted through the interface 420 is image data transmitted from the memory 412 to the printer 430. Another example of the data transmitted through the interface 420 is print condition data representative of the print execution condition and transmitted to the overall controller 400, for example, a print failure notification from the printer 430.

The printer 430 receives image data through the interface 420, and prints the image onto printing paper based on the image data. The printer 430 is a known printer mechanism such as a laser printer or a silver halide photographic paper printer.

On the hard disk drive 440, processing procedures necessary for the overall controller 400 to control operations of the image processing apparatus 100 are stored as computer programs. One of the computer programs is a program for performing the subject inclination detection and the inclination correction which program will be described later with reference to FIGS. 5, 6 and 9. The hard disk drive 440 is not necessarily a hard disk, and a ROM or the like may be used as long as such computer programs can be stored therein.

Figure 5:
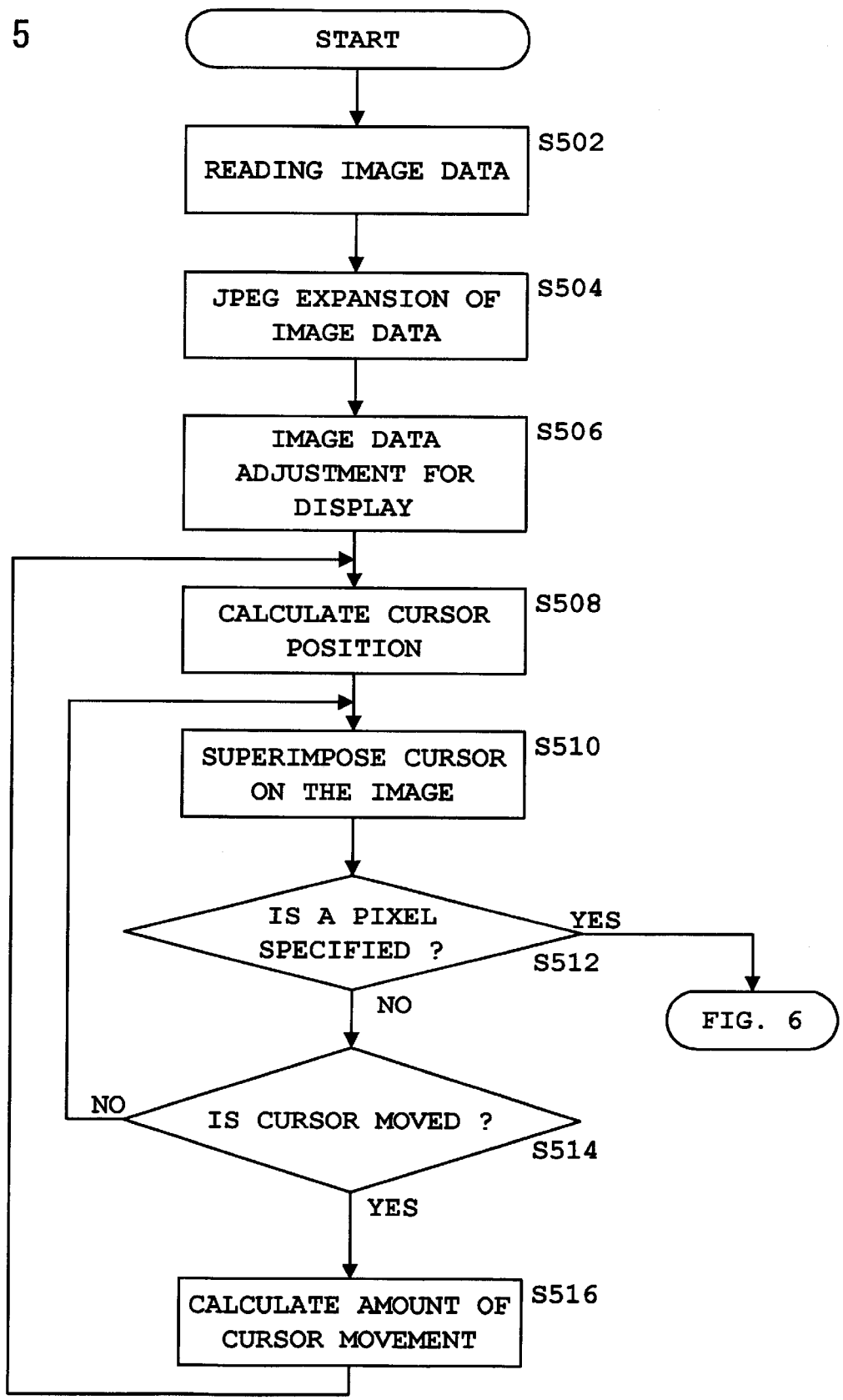
FIG. 5 is a flowchart of an operation controlled by an overall controller.

Subsequently, the operation performed based on control by the overall controller 400 will be described with reference to FIGS. 5 to 9. FIG. 5 is a flowchart of the operation controlled by the overall controller 400 (see FIG. 4). In the description given below, the image data shown in FIGS. 2A to 2D are used as an example as required. That is, it will be described through what operation the overall controller 400 detects the inclination of a straight part (horizon) of the subject, that is, the inclination of the subject by the user specifying one pixel on the screen. The elements referred to below represent the elements of the image processing apparatus 100 of FIG. 4.

First, the overall controller 400 checks that the user dropped a predetermined amount of money into the money slot 106, and turns on the insertion slot indicator 210 or 220 based on an input from the operation portion 108 or 110 to thereby start the operation. The overall controller 400 transmits an image data reading instruction to the drive portion 405 where an image record medium is inserted, and reads JPEG-compressed image data into the memory 412 (S502). In the description given above, it is assumed that the image data is data representative of an image where 1600 (width) by 1200 (length) pixels, R, G and B are each 8-bit data. The overall controller 400 determines that the read image data is JPEG-compressed, and decompresses in the memory 412 the image data stored in the memory 412 (S504). The image data has each of the 1600 by 1200 pixels, R, G and B decompressed to 8-bit data, and is stored into the memory 412.

The overall controller 400 adjusts the image data to be displayed before displaying it on the monitor 112 (S506). That is, the display size of the image is increased or reduced to a size that can be displayed on the monitor 112, and/or the number of colors of the image is changed. For example, when the display performance of the monitor 112 is such that 800 (width) by 600 (length) pixels, R, G and B are each 8-bit data, an image where 1600 (width) by 1200 (length) pixels, R, G and B are each 12-bit data cannot be displayed. Therefore, in order that the entire area of the image is displayed on the monitor 112, the image size is reduced by the image data processor 410 and the number of colors is decreased. When the display size of the image is smaller than the display size of the monitor 112, the image size is increased by the image data processor 410.

In the embodiment, since the image size is such that 1600 (width) by 1200 (length) pixels, R, G and B are each 8-bit data and the display size of the monitor 112 is such that 800 (width) by 600 (length) pixels, R, G and B are each 8-bit data, the length and the width are both halved by a known method (for example, the bicubic method).

Then, the overall controller 400 calculates the position of the cursor for specifying a point, that is, a pixel on the screen (S508), and displays the image of the adjusted image data and the cursor so as to be superimposed on each other (S510, FIG. 2A). When determining that the subject, for example, the horizon (FIG. 2A) is inclined viewing the displayed image, the user specifies one pixel in the vicinity of the horizon with the pixel specifier 414 (FIG. 2B). When recognizing that the pixel P of the image is specified ("YES" of S512), the overall controller 400 performs processing to detect the inclination of the horizon. This processing will be described later with reference to FIG. 6. When no pixel is specified ("NO" of S512), whether the cursor is moved or not is determined (S514). The position of the cursor is always monitored, and the information on the movement is transmitted to the overall controller 400. The overall controller 400 receives the information on the movement as information on the amount of a relative movement from the position of the currently displayed cursor. When the cursor is moved, the amount of the movement is calculated (S516), and the process returns to step S508 to calculate the position of the cursor. When the cursor is not moved, the process returns to step S510.

Subsequently, processing performed when a pixel of the image data is specified by the user ("YES" of S512) will be described with reference to FIG. 6. Hereinafter, the pixel specified by the user will be referred to as "specified pixel."

Figure 6:
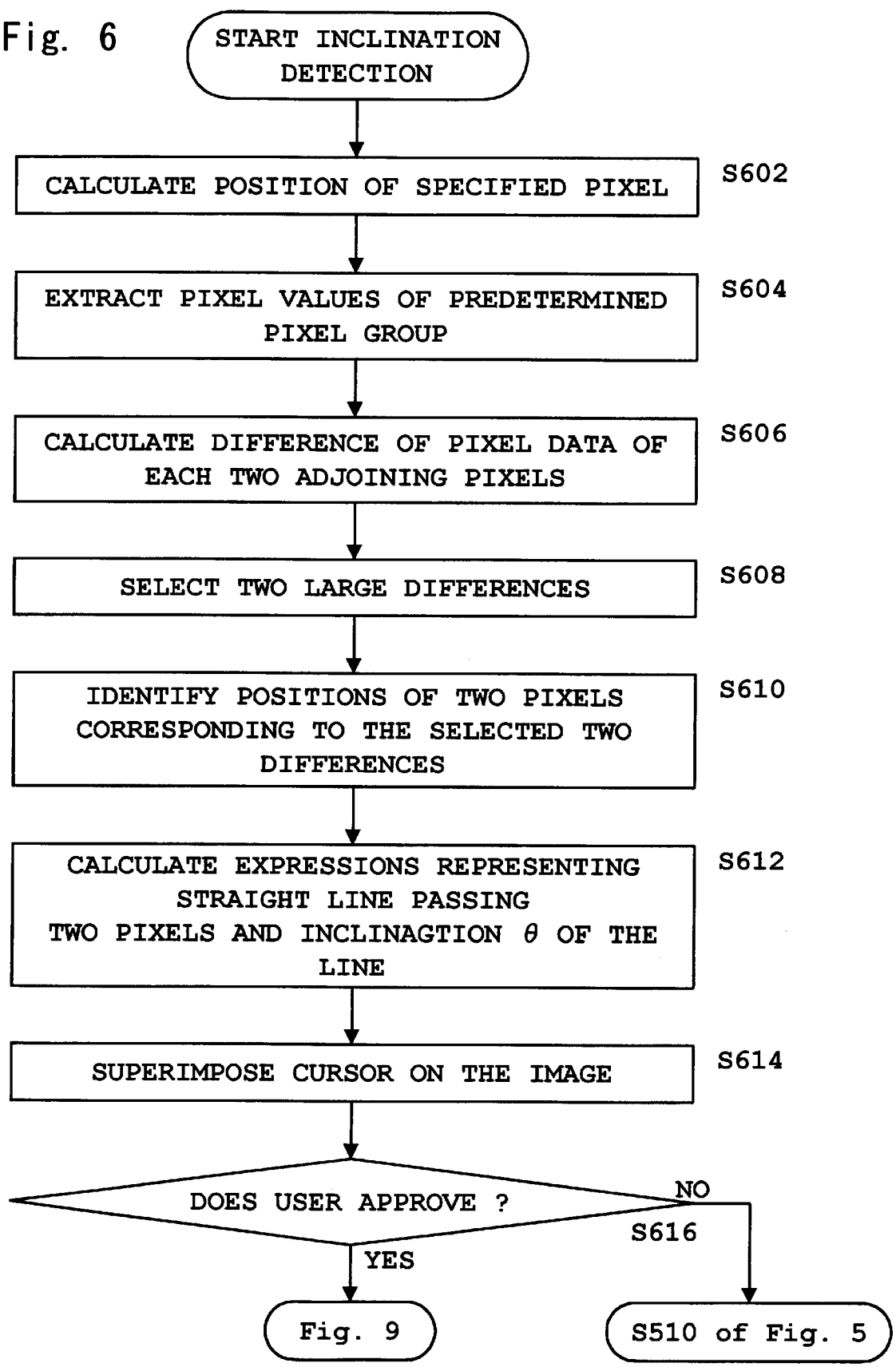
FIG. 6 is a flowchart of processing to detect the inclination of the subject.

FIG. 6 is a flowchart of the processing to detect the inclination of the subject. When the pixel P in the vicinity of the horizon is specified by the user (FIG. 2B), the overall controller 400 calculates the position of the specified pixel P (S602). Then, the overall controller 400 defines a predetermined pixel group, and extracts the pixel values thereof from the image data (S604). Here, the "predetermined pixel group" is a set of a plurality of pixels that constitute the circumference of an area including the specified pixel P and intersect the subject at at least two points. The pixel group is not necessarily defined as a set of physically adjoining pixels of the digital image and may be a set of a plurality of nonadjoining pixels with one or more pixels in between on the digital image which pixels can define an area as the circumference of the area. The "pixel values" are values of R, G and B of each pixel of the pixel group. After the pixel values are extracted, the deviations, that is, the differences in pixel value between adjoining two pixels of the pixel group are calculated (S606) Since the pixel group may be a set of a plurality of nonadjoining pixels on the digital image as mentioned above, naturally, the "adjoining two pixels of the pixel group" include not only physically adjoining two pixels but also two pixels being closest to each other among the pixels of the pixel group. The deviation in pixel value is calculated for each of R, G and B. As a result of calculating the deviations, the overall controller 400 selects two deviations of which absolute values are highest and second highest (S608). In other words, the maximum deviation and the minimum deviation are selected. The selection of the deviations is also performed for each of R, G and B. The overall controller 400 locates the pixels corresponding to the selected deviations (S610). Since the deviations are obtained based on the differences in pixel value between two pixels as mentioned above, pixels having the pixel values corresponding to the minuends and pixels having the pixel values corresponding to the subtrahends are necessary. In this specification, "locating a pixel" indicates selecting a pixel having the pixel value corresponding, for example, to the minuend.

Figure 7:
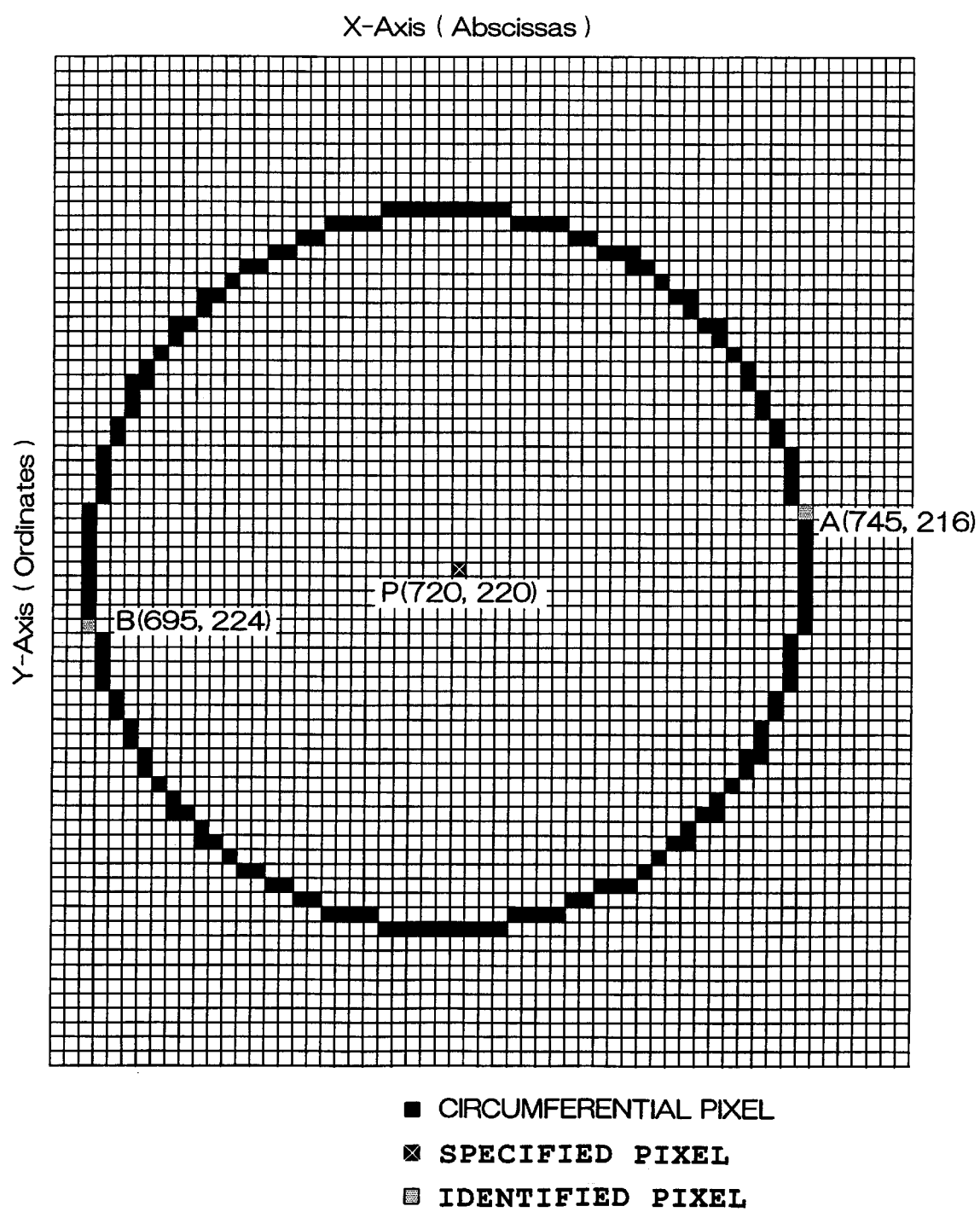
FIG. 7 is a view showing a specified pixel P and a pixel group (circumferential pixels of a circle) being twenty-five pixels away from the specified pixel P.
Figure 8:
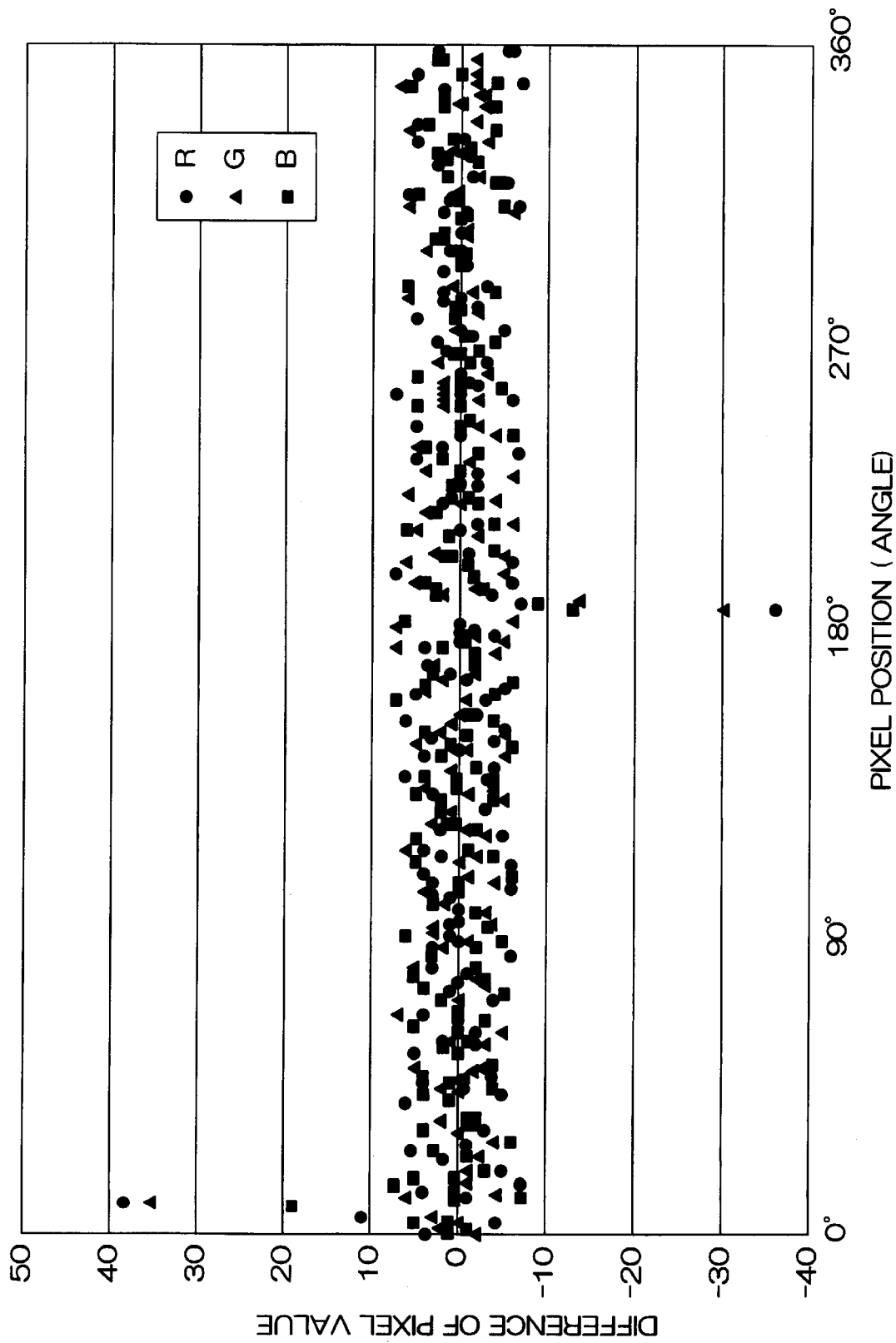
FIG. 8 is a view showing results of a calculation of deviations for each of R, G and B performed for the specified pixel P and the circumferential pixels.

Explaining concretely, in the embodiment, the "predetermined pixel group" mentioned above comprises circumferential pixels that constitute the circumference of a circle having a radius of twenty-five pixels with the position of the specified pixel P as the center. FIG. 7 shows the specified pixel P and a group of pixels that are twenty-five pixels away from the specified pixel P, that is, circumferential pixels of a circle. In FIG. 7, the upper left of the image plane is the origin (0, 0), the horizontal direction of the display frame is the x-axis (positive to the right), the vertical direction is the y-axis (positive to the bottom), and the specified pixel P is shown as (720, 220). The results of the calculation of deviations for each of R, G and B performed for the specified pixel P and the circumferential pixels are shown in FIG. 8. The longitudinal axis represents the deviations in the pixel values of each of R, G and B. The lateral axis represents an angle between a radius line extending from the specified pixel P parallelly to the x-axis and a line segment defined by the specified pixel P and the circumferential pixels which angle is measured clockwise from the radius line. According to FIG. 8, the two deviations of which absolute values are highest and second highest are deviations of approximately 10° and approximately 190° (particularly, deviations for R and G). Therefore, the overall controller 400 selects the deviations of approximately 10° and approximately 190°, and identifies the two pixels corresponding to the deviations. Since there are cases where the extreme values of the deviations for one or two of the three elements R, G and B cannot be determined when the subject has a certain coloration, the two pixels can be identified based on at least one of R, G and B. FIG. 7 shows two pixels A and B identified in this manner. When the specified pixel P is (720, 220), the identified pixel A is (745, 216) and the identified pixel B is (695, 224).

FIG. 7 shows a case where the specified pixel P and the identified pixels A and B are all on the horizon, that is, a case where the pixel P specified by the user is on the horizon. However, the pixels A and B can be identified even when the user cannot point a pixel on the horizon. In this case, it is necessary that the circle with the position of the pixel P as the center and the horizon which is the subject intersect at two points. While the area is a circle in the above-described example, the area is not necessarily a circle. The area may be a closed area such as a rectangle or a triangle or may be an open area as long as it intersects the horizon which is the subject at two points. However, since the image processing apparatus 100 (see FIG. 1) cannot know in advance whether the circle and the horizon intersect at two points or not, a circle having a radius of a sufficient length larger than twenty-five pixels may be used.

Referring again to FIG. 6, by the two pixels being located, the overall controller 400 determines that the straight line passing through the pixels is the horizon, that is, the straight part of the subject. This is because the selected two pixels are pixels where the change in brightness between adjoining pixels is large. Therefore, it can be considered that the straight line connecting these pixels is the horizon, and by detecting the inclination of the straight line, the overall inclination of the subject in the image can be detected.

Based on the positions of the identified pixels, the overall controller 400 calculates expressions representing the straight line and the inclination θ of the straight line (S612) When the identified pixels A and B are generalized as A($x_A$, $y_A$) and B($x_B$, $y_B$), the inclination θ of the straight line AB can be expressed as $$\theta = \tan^{-1}((y_A - y_B)/(x_A - x_B)).$$

The point (x, y) on the straight line AB can be expressed as $$y = ((y_A - y_B)/(x_A - x_B))(x - x_A) + y_A.$$

Then, the overall controller 400 displays the image data, the cursor and the straight line of which expression has been calculated on the monitor 112 so as to be superimposed on one another (S614, FIG. 2C). The straight line is displayed in a color distinguishable from the horizon, for example, the complementary color of the color of the identified pixels, or displayed as a line of a kind distinguishable from the horizon, for example, a broken line. Viewing the displayed image, the user determines whether the calculated straight line coincides with the horizon or not, that is, whether the image processing apparatus 100 accurately detected the straight part of the subject or not. The user enters whether to approve the straight line or not from the operation portion 108, 110 or the like (S616) When the user approves the straight line, the overall controller 400 executes a flowchart of processing to rotate the image for correction of the inclination of the subject (see FIG. 9). When the user does not approve the straight line, the overall controller 400 repeats the procedure from the step of specifying a pixel (S510 of FIG. 5). At this time, the calculated straight line is erased from the screen of the monitor 112.

As described above, the user can identify two pixels A and B by specifying one point in the vicinity of a straight part of the subject. Since the straight line determined by the pixels A and B can be considered the straight part of the subject, the overall inclination of the subject in the image can be detected by detecting the inclination of the straight line determined by the pixels A and B. Therefore, the structure is particularly useful when a touch panel or the like with which pixel specification in units of pixels is comparatively difficult is used as the pixel specifier 414.

Subsequently, processing to decide the direction in which the image is rotated in accordance with the inclination of the calculated straight line and rotate the image in the direction will be described. The "direction in which the image is rotated" is a direction in which a horizontal straight line is to be parallel to the x-axis, and is a direction in which a vertical straight line is to be parallel to the y-axis. When the straight part of the subject is a horizontal straight line, as shown in FIG. 2A, it is presumed that the inclination θ of the subject does not largely deviate from 0°. This is because there are few cases where the horizon is photographed being inclined as much as approximately 90°. Likewise, when the straight part of the subject is a vertical straight line (for example, an edge along the height of a building), it is presumed that the inclination θ of the subject does not largely deviate from 90°. In the embodiment, when the inclination θ of the straight part of the subject is smaller than 45°, the overall controller 400 determines that the straight part is a horizontal straight line such as the horizon. Consequently, the overall controller 400 determines that the image is to be rotated so that the straight part is parallel to the x-axis. Then, the overall controller 400 rotates the entire image by an angle (−θ) so that the inclination of the straight part is 0°, that is, the straight part is parallel to the x-axis. With this, the overall inclination of the subject in the image is also corrected. When the inclination θ of the straight part is larger than 45°, the overall controller 400 determines that the straight part is a vertical straight line. Consequently, the overall controller 400 determines that the image is to be rotated so that the straight part is parallel to the y-axis. Then, since the angle from the y-axis can be obtained by (θ−90°), the overall controller 400 sets this angle as the new θ, and rotates the image by an angle (−θ). For example, when it is assumed that the original angle θ of the subject obtained at step S612 (see FIG. 6) is 80°, the value of (θ−90°) is −10°. This indicates that the detected straight part is inclined 10° from the y-axis in the quadrant of X>0 and Y>0 of FIGS. 2A to 2D. Here, letting θ=−10°, the image is rotated by an angle (−θ) (=10°). Then, the inclination of the straight part is 0° with respect to the y-axis, that is, the straight part is parallel to the y-axis. With this, the overall inclination of the subject in the image is also corrected.

As described above, according to whether the angle of the straight line obtained at S612 (see FIG. 6) is larger or smaller than 45°, the over all controller 400 determines whether to rotate the image so that the straight line is parallel to the x-axis or parallel to the y-axis. Since the overall controller 400 sets the angle from the x- or y-axis as θ, the inclination of the subject can be corrected by rotating the image by an angle (−θ) in cases of any rotation directions.

Figure 9:
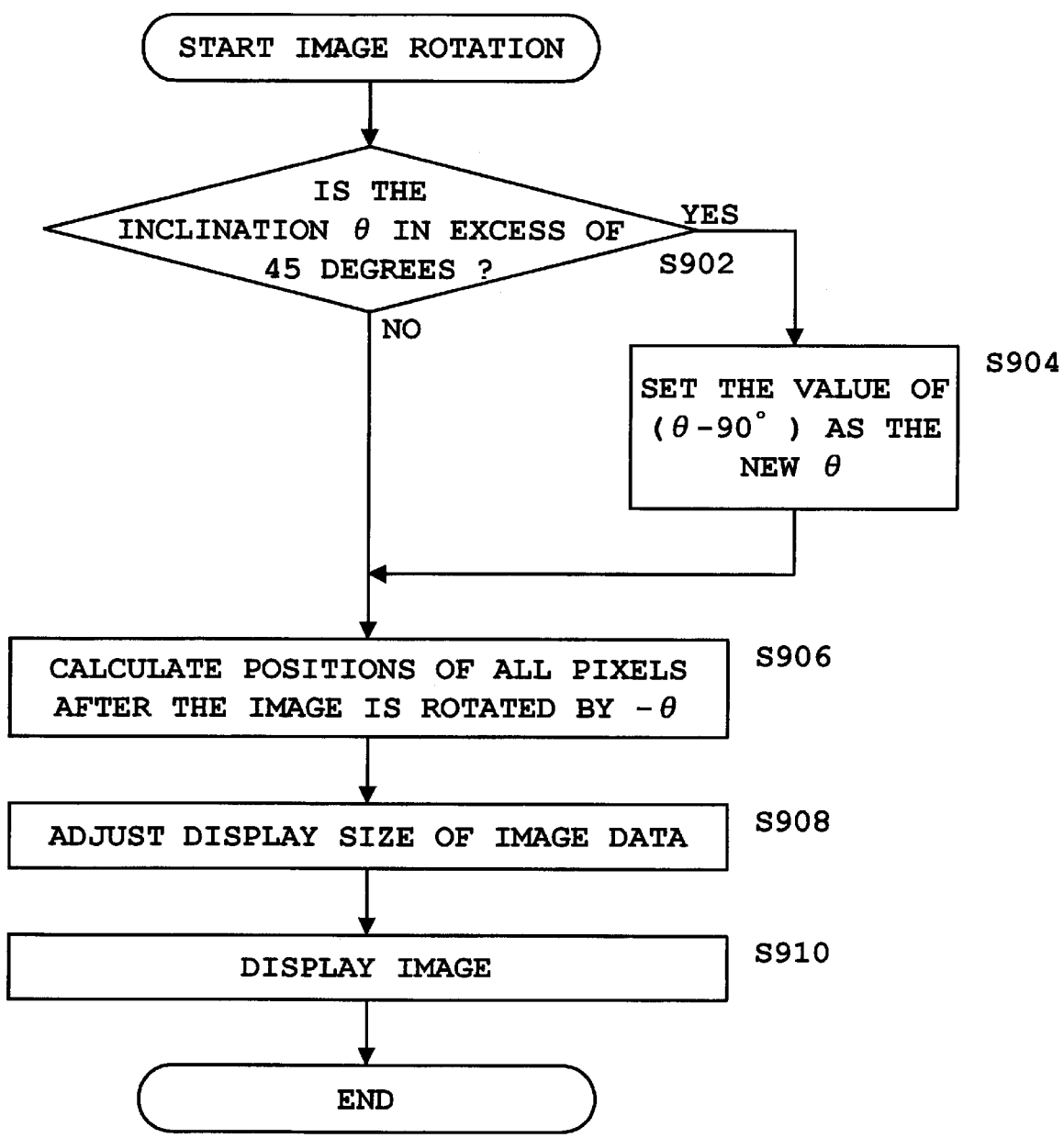
FIG. 9 is a flowchart of processing to rotate an image.

FIG. 9 shows a flowchart of the processing to rotate the image. First, as described above, the overall controller 400 determines whether the inclination θ of the straight part is not less than 45° or not (step S902). When the inclination is not less than 45°, the overall controller 400 calculates (θ−90°), and sets the value as the new θ (S904). When the inclination θ of the straight part is smaller than 45°, the process proceeds to the next step S906. Then, the overall controller 400 calculates the positions of the pixels of the image rotated by an angle (−θ) (S906).

When it is assumed that the coordinates (x, y) before the rotation are shifted to coordinates (X, Y) by the rotation, a known relation shown below holds between the coordinates (x, y) and the coordinates (X, Y):

$$X = x \cdot \cos(-\theta) - y \cdot \sin(-\theta)$$
$$Y = x \cdot \sin(-\theta) + y \cdot \cos(-\theta)$$

When the coordinates (X, Y) of all the pixels after the rotation are obtained, the image data processor 410 changes the arrangement of the pixels for display on the monitor 112. Then, the image data processor 410 adjusts the display position and the display size of the image so that the rotated image is displayed within the display frame of the monitor 112 (S908, FIG. 2D). In FIG. 2D, the image is displayed being inclined with respect to the display frame of the monitor 112. For this reason, the image may be trimmed so that the sides of the image are parallel to the x-axis and the y-axis. After the image is adjusted for display, the overall controller 400 displays the image on the monitor 112 (S910). The displayed image is printed by the printer 430 in response to a print instruction from the user. Alternately, the displayed image is stored onto a predetermined record medium.

The above is the description of the embodiment. In the description given above, whether the straight part is a horizontal straight line or a vertical straight line is determined based on whether the angle of the straight line obtained at S612 (see FIG. 6) is larger or smaller than 45° and the overall controller 400 decides the direction of rotation of the image. However, there are cases where further processing is necessary. For example, further processing is necessary when display of an image where the horizon is photographed at an angle close to 90° is corrected. In this case, although the image processing apparatus 100 (see FIG. 1) can appropriately detect the horizon, it rotates the image so that the horizon is parallel to the y-axis. In such a case, the image processing apparatus 100 may further rotate the image in response to an instruction from the user to further rotate the image by ±90°.

Moreover, the accuracy of the straight part detection can be increased by specifying one point in the image to detect a straight part of the subject and specifying another one or more points so that the straight part is detected for each of the points. The accuracy of the detection of the straight part of the subject can also be increased by using both the subject detection described in the embodiment and the conventionally performed method of identifying the subject based on specified two points.

In the embodiment, the digital image is image data compressed by the JPEG compression method. However, the digital image may be compressed by a compression method other than the JPEG compression method, or may have an image format not being compressed. In the latter case, the step of decompressing the compressed image performed in the above-described embodiment is unnecessary. Further, the digital image is not limited to a still image and may be a moving image of Motion JPEG, MPEG or the like. Since a moving image is realized by continuously displaying still images (frames), by performing for each frame similar processing to that performed in the above-described case of a still image, a moving image can be displayed while the inclination of the subject is corrected in real time. The setting of the specified pixel is necessarily performed only once in the first frame. In the succeeding frames, the pixels corresponding to the position of the specified pixel in the first frame are used as the specified pixel. However, the setting of the specified pixel can be performed in a given frame when necessary. This technology is particularly effective for image formats not being interframe-compressed such as Motion JPEG.

In the description given above, the processing procedures of the image processing apparatus 100 (see FIGS. 1 and 4) described with reference to FIGS. 5, 6 and 9 maybe described as a computer program and stored on a record medium. The record medium includes the hard disk drive 440 (see FIG. 4), a magnetic record medium such as a floppy disk, an optical record medium such as an optical disk, and a semiconductor storage medium such as a flash ROM. Here, the concept of the "recordmedium" includes a storage device such as a computer providing contents through an electric communication line such as the Internet. Therefore, a server or the like for storing therein a computer program to realize the operation of the present invention and transmitting the program to another terminal is included in the category of the record medium storing a computer program therein.

The image processing apparatus 100 (see FIG. 1) is not limited to a vending machine type apparatus as long as it can execute such a computer program, and may be a computer such as a desktop computer or a laptop computer.

According to the above-described structure, a predetermined pixel group is defined based on specified one point in the vicinity of the subject, a straight part of the subject is identified based on the deviations in pixel value of the pixel group, and the inclination of the straight part is detected. With this, how much the subject is inclined in the image can easily be determined.

Further, according to the above-described structure, the inclination of the subject can be corrected by rotating the image based on the detected inclination of the straight part. In doing this, since the direction in which the image is rotated is decided according to the inclination, only by specifying one point in the image, the user can obtain an image where the inclination is corrected.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An inclination detecting device comprising:
    a display for displaying on a screen a subject image comprising a plurality of pixels;
    a pixel specifier for specifying a first pixel from among the pixels based on an operation by an user;
    a calculator for defining a pixel group constituting a circumference of an area including the specified first pixel, and calculating deviations in pixel value between adjoining pixels of the pixel group; and
    a detector for selecting a second pixel and a third pixel based on the calculated deviations, and detecting an inclination of a straight part of the subject based on the selected second and third pixels.

2. An inclination detecting device according to claim 1, wherein said detector selects pixels where the deviations are maximum and minimum as the second pixel and the third pixel.

3. An inclination detecting device according to claim 1, wherein said detector detects the inclination of a straight line connecting the second pixel and the third pixel as the inclination of the straight part of the subject, and
    said inclination detecting device further comprises an image rotation processor for rotating the image based on the detected inclination of the straight part to thereby correct the inclination.

4. An inclination detecting device according to claim 3, wherein said image rotation processor decides the direction in which the image is rotated, according to the inclination of the straight part.

5. An image processing apparatus comprising:
    a display for displaying on a screen a subject image comprising a plurality of pixels;
    a pixel specifier for specifying a first pixel from among the pixels based on an operation by an user;
    a calculator for defining a pixel group constituting a circumference of an area including the specified first pixel, and calculating deviations in pixel value between adjoining pixels of the pixel group; and
    a detector for selecting a second pixel and a third pixel based on the calculated deviations, and detecting an inclination of a straight part of the subject based on the selected second and third pixels.

6. An image processing apparatus according to claim 5, wherein said detector selects pixels where the deviations are maximum and minimum as the second pixel and the third pixel.

7. An image processing apparatus according to claim 5, wherein said detector detects the inclination of a straight line connecting the second pixel and the third pixel as the inclination of the straight part of the subject, and
    said image processing apparatus further comprises an image rotation processor for rotating the image based on the detected inclination of the straight part to thereby correct the inclination.

8. An image processing apparatus according to claim 7, wherein said image rotation processor decides the direction in which the image is rotated, according to the inclination of the straight part.

9. An inclination detecting method comprising:
    displaying on a screen a subject image comprising a plurality of pixels;
    accepting a specifying, by a user, of a first pixel from among the pixels;
    defining a pixel group constituting a circumference of an area including the specified first pixel and calculating deviations in pixel value between adjoining pixels of the pixel group;
    selecting a second pixel and a third pixel based on the calculated deviations; and
    detecting an inclination of a straight part of the subject based on the selected second and third pixels.

10. An inclination detecting method according to claim 9, wherein in said selecting, pixels where the deviations are maximum and minimum are selected as the second pixel and the third pixel.

11. An inclination detecting method according to claim 9, wherein in said detecting, the inclination of a straight line connecting the second pixel and the third pixel is detected as the inclination of the straight part of the subject, and
    said inclination detecting method further comprises rotating the image based on the detected inclination of the straight part to thereby correct the inclination.

12. An inclination detecting method according to claim 11, wherein in said rotating, the direction in which the image is rotated is decided according to the inclination of the straight part.

13. An image processing apparatus which executes:
    displaying on a screen a subject image comprising a plurality of pixels;
    accepting a specifying, by a user, of a first pixel from among the pixels;
    defining a pixel group constituting a circumference of an area including the specified first pixel and calculating deviations in pixel value between adjoining pixels of the pixel group;
    selecting a second pixel and a third pixel based on the calculated deviations; and
    detecting an inclination of a straight part of the subject based on the selected second and third pixels.

14. An image processing apparatus according to claim 13, wherein in said selecting, pixels where the deviations are maximum and minimum are selected as the second pixel and the third pixel.

15. An image processing apparatus according to claim 13, wherein in said detecting, the inclination of a straight line connecting the second pixel and the third pixel is detected as the inclination of the straight part of the subject, and
    said image processing apparatus further executes rotating the image based on the detected inclination of the straight part to thereby correct the inclination.

16. An image processing apparatus according to claim 15, wherein in said rotating, the direction in which the image is rotated is decided according to the inclination of the straight part.

17. A computer program product for executing a method comprising:
    displaying on a screen a subject image comprising a plurality of pixels;
    accepting a specifying, by a user, of a first pixel from among the pixels;
    defining a pixel group constituting a circumference of an area including the specified first pixel and calculating deviations in pixel value between adjoining pixels of the pixel group;

selecting a second pixel and a third pixel based on the calculated deviations; and detecting an inclination of a straight part of the subject based on the selected second and third pixels.

18. A computer program product according to claim 17, wherein in said selecting, pixels where the deviations are maximum and minimum are selected as the second pixel and the third pixel.

19. A computer program product according to claim 17, wherein in said detecting, the inclination of a straight line connecting the second pixel and the third pixel is detected as the inclination of the straight part of the subject, and said computer program product further executes rotating the image based on the detected inclination of the straight part to thereby correct the inclination.

20. A computer program product according to claim 19, wherein in said rotating, the direction in which the image is rotated is decided according to the inclination of the straight part.

21. An image processing apparatus for executing a computer program recorded in a medium, said computer program comprising procedures of:

displaying on a screen a subject image comprising a plurality of pixels;

accepting a specifying, by a user, of a first pixel from among the pixels;

defining a pixel group constituting a circumference of an area including the specified first pixel and calculating deviations in pixel value between adjoining pixels of the pixel group;

selecting a second pixel and a third pixel based on the calculated deviations; and detecting an inclination of a straight part of the subject based on the selected second and third pixels.

22. An image processing apparatus according to claim 21, wherein in said selecting, pixels where the deviations are maximum and minimum are selected as the second pixel and the third pixel.

23. An image processing apparatus according to claim 21, wherein in said detecting, the inclination of a straight line connecting the second pixel and the third pixel is detected as the inclination of the straight part of the subject, and said image processing apparatus further executes a procedure of rotating the image based on the detected inclination of the straight part to thereby correct the inclination.

24. An image processing apparatus according to claim 23, wherein in said rotating, the direction in which the image is rotated is decided according to the inclination of the straight part.

* * * * *